US010579413B2

(12) United States Patent
Benhase et al.

(10) Patent No.: US 10,579,413 B2
(45) Date of Patent: Mar. 3, 2020

(54) EFFICIENT TASK SCHEDULING USING A LOCKING MECHANISM

(71) Applicant: INTERNATIONAL BUSINESS MACHINES CORPORATION, Armonk, NY (US)

(72) Inventors: Michael T. Benhase, Tucson, AZ (US); Lokesh M. Gupta, Tucson, AZ (US); Trung N. Nguyen, Tucson, AZ (US); David B. Whitworth, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 307 days.

(21) Appl. No.: 13/966,468

(22) Filed: Aug. 14, 2013

(65) Prior Publication Data
US 2015/0052529 A1 Feb. 19, 2015

(51) Int. Cl.
*G06F 9/46* (2006.01)
*G06F 9/52* (2006.01)

(52) U.S. Cl.
CPC .............. *G06F 9/46* (2013.01); *G06F 9/526* (2013.01)

(58) Field of Classification Search
None
See application file for complete search history.

(56) References Cited

U.S. PATENT DOCUMENTS

| 5,274,809 | A | * | 12/1993 | Iwasaki et al. ............... 718/104 |
| 6,112,222 | A | * | 8/2000 | Govindaraju et al. ........ 718/102 |
| 6,965,961 | B1 | | 11/2005 | Scott |
| 7,861,042 | B2 | * | 12/2010 | Larson .................... G06F 15/16 710/107 |
| 2005/0081204 | A1 | * | 4/2005 | Schopp ......................... 718/100 |
| 2009/0254555 | A1 | | 10/2009 | Balakrishnan et al. |
| 2012/0240126 | A1 | * | 9/2012 | Dice ............................. 718/104 |
| 2012/0304185 | A1 | | 11/2012 | Horikawa |
| 2013/0080672 | A1 | * | 3/2013 | Tal .......................... G06F 9/526 710/200 |

FOREIGN PATENT DOCUMENTS

| CN | 1601478 A | 3/2005 |
| CN | 102566979 A | 7/2012 |
| JP | 03-018935 | 6/1989 |
| JP | 01297760 A | 11/1989 |
| JP | 02171952 A | 7/1990 |
| JP | 06012394 A | 1/1994 |
| WO | 2011096163 A1 | 8/2011 |
| WO | 2013078692 A1 | 6/2013 |
| WO | 2013096163 A1 | 6/2013 |

OTHER PUBLICATIONS

Takada et al., "Intra-Processor vs. Inter-Processor Synchronizations in Real-Time Multiprocessor Systems," Department of Information Science, Japan, Mar. 12, 1993 (11 pages).

Fukuda, "Microprocessor Operating Systems," Corona Publishing Co., Ltd., Japan, 1997 (8 pages).

* cited by examiner

*Primary Examiner* — Lewis A Bullock, Jr.
*Assistant Examiner* — Bruce S Ashley
(74) *Attorney, Agent, or Firm* — Griffiths & Seaton PLLC

(57) ABSTRACT

For efficient task scheduling using a locking mechanism, a new task is allowed to spin on the locking mechanism if a number of tasks spinning on the locking mechanism is less than a predetermined threshold for parallel operations requiring locks between the multiple threads.

3 Claims, 4 Drawing Sheets

EFFICIENT TASK SCHEDULING USING A LOCKING MECHANISM

BACKGROUND OF THE INVENTION

Field of the Invention

The present invention relates in general computing systems, and more particularly to, systems and methods for efficient task scheduling using a locking mechanism for parallel operations requiring locks between the multiple threads in a computing environment.

Description of the Related Art

In today's society, computer systems are commonplace. Computer systems may be found in the workplace, at home, or at school. Computer systems may include data storage systems, or disk storage systems, to process and store data. Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

SUMMARY OF THE INVENTION

In one embodiment, a method is provided for efficient task scheduling using a locking mechanism using at least one processor device in a computing environment. In one embodiment, by way of example only, a new task is allowed to spin on the locking mechanism if a number of tasks spinning on the locking mechanism is less than a predetermined threshold for parallel operations requiring locks between the multiple threads.

In another embodiment, a computer system is provided for efficient task scheduling using a locking mechanism using at least one processor device, in a computing environment. The computer system includes a computer-readable medium and a processor in operable communication with the computer-readable medium. In one embodiment, by way of example only, the processor allows a new task to spin on the locking mechanism if a number of tasks spinning on the locking mechanism is less than a predetermined threshold for parallel operations requiring locks between the multiple threads.

In a further embodiment, a computer program product is provided for efficient task scheduling using a locking mechanism using at least one processor device, in a computing environment. The computer-readable storage medium has computer-readable program code portions stored thereon. The computer-readable program code portions include a first executable portion that allows a new task to spin on the locking mechanism if a number of tasks spinning on the locking mechanism is less than a predetermined threshold for parallel operations requiring locks between the multiple threads.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
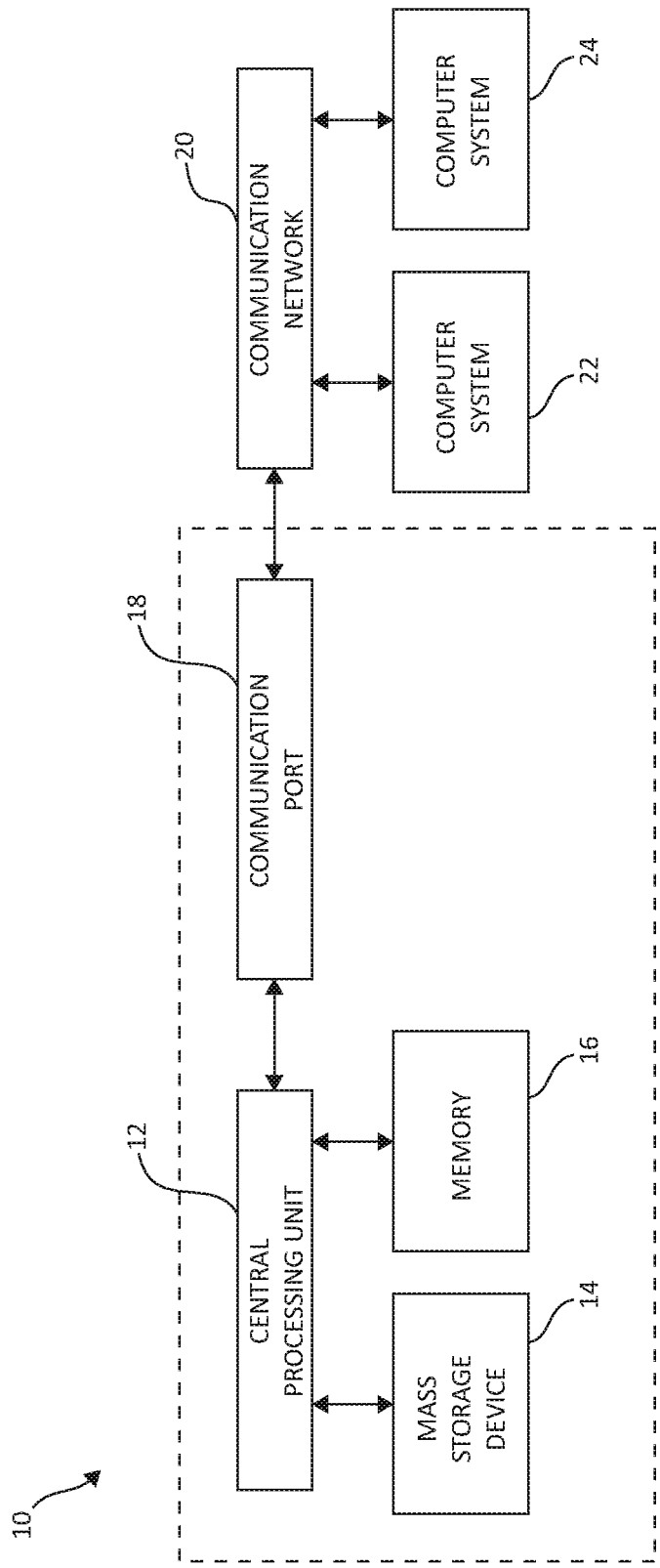
FIG. 1 is a block diagram illustrating a computing system environment having an example storage device in which aspects of the present invention may be realized.

In one embodiment, an architecture in a multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Directories may be used to identify which nodes have cached copies of data corresponding to a particular address. Coherency activities may be generated via examination of the directories. In one embodiment, distributed shared memory systems are scalable, overcoming various limitations associated with shared bus architectures. Since many of the processor accesses are completed within a node, nodes typically have much lower bandwidth requirements upon the network in comparison to the bandwidth requirements a shared bus architecture must provide upon its shared bus to attain comparable performance. The nodes may operate at high clock frequency and bandwidth, accessing the network when needed. Additional nodes may be added to the network without affecting the local bandwidth of the nodes. With logical partitioning, a shared resource, referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer.

Moreover, in one embodiment, large-scale databases and Internet transaction applications demand parallel servers capable of running on machines with twenty to a hundred processors or more. Moreover, in one embodiment, parallel programming in some way may involve the use of locking at the lowest levels. Locks are primitives that provide mutual exclusion that allow data structures to remain in consistent states. In one embodiment, without a locking mechanism, multiple threads of execution may simultaneously modify a data structure. Without a carefully thought out, and usually complex, lock-free algorithm, the result is usually a crash or hang as unintended program states are entered. Since the creation of a lock-free algorithm is extremely difficult, most programs use locks. If updating a data structure is slow, the lock of choice is a mutex (e.g., mutual exclusion) of some kind. These will transfer control to the operating system when they block. This allows another thread to run, and perhaps make progress whilst the first thread sleeps. This transfer of control consists of a pair of context switches, which are quite a slow operation. Thus, if the lock-hold time is expected to be short, then this may not be the fastest method.

In one embodiment, a spin-lock operation may be used in parallel operations and the spin lock operation may be associated with software locks that are used by programs to ensure that only one parallel process at a time can access a critical region of memory. In one embodiment, spin locks may be used for mutual exclusion. A spinlock is a lock which causes a thread trying to acquire it to simply wait in a loop ("spin") while repeatedly checking if the lock is available. Since the thread remains active but is not performing a useful task, the use of such a lock is a kind of busy waiting. Once acquired, spinlocks may be held until they are explicitly released, although in some implementations they may be automatically released if the thread being waited on (that which holds the lock) blocks, or "goes to sleep".

In one embodiment, the spin lock (e.g., a semaphore) may be implemented as a variable or token that is associated with a shared pointer to a data structure, and that is readable by multiple threads to determine whether the pointer is currently being used by one of the threads. Whenever a thread reads a semaphore that indicates that no other thread is currently using the pointer, the thread is able to set the semaphore to a value that indicates to all other threads that the pointer is currently in use (a process referred to as "acquiring" a semaphore). Thus, when another thread wishes to access the data structure, but detects that the semaphore is held by another thread, that thread is required to wait until the other thread releases the semaphore to indicate that the pointer (and thus the data structure) is again accessible to other threads. In one embodiment, only one thread is permitted to hold a semaphore at any given time.

Moreover, in one embodiment, instead of context switches, a spinlock will "spin", and repeatedly check to see if the lock is unlocked. Spinning is very fast, so the latency between an unlock-lock pair is small. However, spinning doesn't accomplish any work, so may not be as efficient as a sleeping mutex if the time spent becomes significant. Thus, the present invention provides a solution that 1) increases computing efficiencies by decreasing the waste of CPU cycles while spinning all the time, and 2) allows for the tasks to avoid going to sleep and re-dispatch the task all the time if the tasks are unable to get a lock right away.

Thus, the present invention provides for efficient task scheduling using a locking mechanism using at least one processor device in a computing environment. In one embodiment, by way of example only, a new task is allowed to spin on the locking mechanism if a number of tasks spinning on the locking mechanism is less than a predetermined threshold for parallel operations requiring locks between the multiple threads. The new task(s) are prevented/prohibited from spinning on the locking mechanism if the number of the tasks spinning on the locking mechanism is one of equal to and more than the predetermined threshold. The number of the tasks currently spinning on the locking mechanism are obtained prior to allowing the new task to spin on the locking mechanism. The new task(s) are failed if the number of the tasks spinning on the locking mechanism is equal to and/or more than the predetermined threshold. The new task(s) are exited to a dispatch queue when the number of the tasks spinning on the locking mechanism is one of equal to and more than the predetermined threshold. The locking mechanism is called for determining if the number of tasks spinning on the locking mechanism is less than the predetermined threshold. In one embodiment, the present invention implements the locking mechanism for determining if the number of tasks spinning on the locking mechanism is less than the predetermined threshold on top of one of a ticket based lock and a queue based lock. The locking mechanism is a new Lock_Try_or_Spin. The Lock_Try_or_Spin spins for the lock based on a predetermined threshold and/or exits the task to the dispatch queue. The present invention has a similar action of a traditional try-Lock mechanism where the code tries to get a lock a number of times and exits if it can't get a lock, whereas the new try-or-spin-lock will spin for lock if the predetermined threshold criteria is met and immediately exit if not. In one embodiment, a ticket based lock is a locking algorithm that is a type of spinlock which uses "tickets" to control which thread of execution is allowed to enter a critical section.

In one embodiment, the ticket lock works as follows; there are two integer values which begin at 0. The first value is the queue ticket, the second is the dequeue ticket. When a thread arrives, it atomically obtains and then increments the queue ticket. It then atomically compares its ticket's value (before the increment) with the dequeue ticket's value. If they are the same, the thread is permitted to enter the critical section. If they are not the same, then another thread must already be in the critical section and this thread must busy-wait or yield. When a thread leaves the critical section controlled by the lock, it atomically increments the dequeue ticket. This permits the next waiting thread to enter the critical section.

In one embodiment, the queue-based spin locks avoid contention by arranging for every waiting thread to spin on a separate, local flag in memory. The queue-based spin locks guarantee fairness by maintaining a queue of waiters and by granting the lock to the first waiter during an unlock operation. In one embodiment, with the queue-based lock, each waiting process is linked to its predecessor and successor in the queue. The queue-based spin locks may also be called try locks and allow a process to abandon its attempt to acquire a lock after a given amount of time. The process can then follow some other code path.

In one embodiment, the present invention may use queue-based locks and/or ticket locks that indicates how many tasks are spinning on a spin lock. In one embodiment, of a test and set spin lock, the processes may be mutually anonymous. In a queue-based lock, they are not mutually exclusive, and each waiting process is linked to its predecessor and successor in the queue. Thus, with the queue-based locks the present invention is able to discern/indicate how many tasks are spinning on a lock. Even without queue-based locks, the present invention builds a spin lock, which can tell how many tasks are spinning on a lock. For example, with ticket locks the present invention may look at the last given ticket number and current serving ticket number and see how many tasks are spinning.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
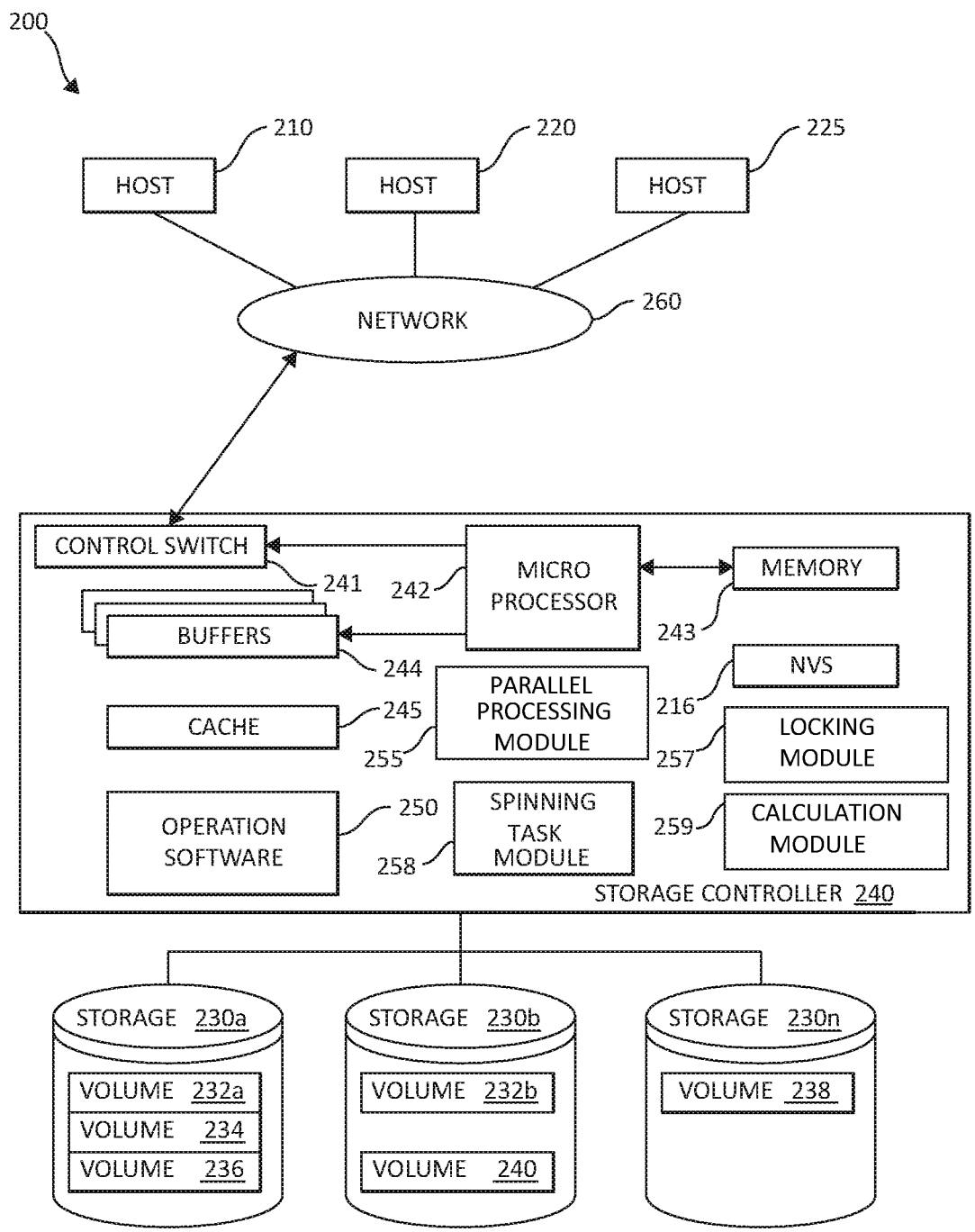
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a Fibre Connectivity (FICON) or Enterprise Systems Connection (ESCON) I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230a-n. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230a-n may be comprised of one or more storage devices, such as storage arrays, which are connected to storage controller 240 by a storage network.

In some embodiments, the devices included in storage 230a-n may be connected in a loop architecture. Storage controller 240 manages storage 230a-n and facilitates the processing of write and read requests intended for storage 230a-n. The system memory 243 of storage controller 240 stores the operation software 250, program instructions and data, which the processor 242 may access for executing functions and method steps associated with managing storage 230a-n, and executing the steps and methods of the present invention. As shown in FIG. 2, system memory 243 may also include or be in communication with a cache 245 for storage 230a-n, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230a-n may be physically comprised of one or more storage devices, such as storage arrays. A storage array is a logical grouping of individual storage devices, such as a hard disk. In certain embodiments, storage 230a-n is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a parallel processing module 255 (e.g., parallel operations processing module), a locking module 257 (e.g., a Lock_Try_or_Spin module), a spinning task module 258, and a calculation module 259 (e.g., a calculation module for determining the number of spinning tasks). The parallel processing module 255, the locking module 257, the spinning task module 258, and a calculation module 259 may be one complete module functioning simultaneously or separate modules. The parallel processing module 255, the locking module 257, the spinning task module 258, and a calculation module 259 may have some internal memory (not shown) and may store unprocessed, processed, or "semi-processed" data. The parallel processing module 255, the locking module 257, the spinning task module 258, and a calculation module 259 may work in conjunction with each and every component of the storage controller 240, the hosts 210, 220, 225, and other storage controllers 240 and hosts 210, 220, and 225 that may be remotely connected via the storage fabric 260. Both the parallel processing module 255, the locking module 257, the spinning task module 258, and a calculation module 259 may be structurally one complete module or may be associated and/or included with other individual modules. The parallel processing module 255, the locking module 257, the spinning task module 258, and a calculation module 259 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the parallel processing module 255, the locking module 257, the spinning task module 258, and a calculation module 259 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the parallel processing module 255, the locking module 257, the spinning task module 258, and a calculation module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
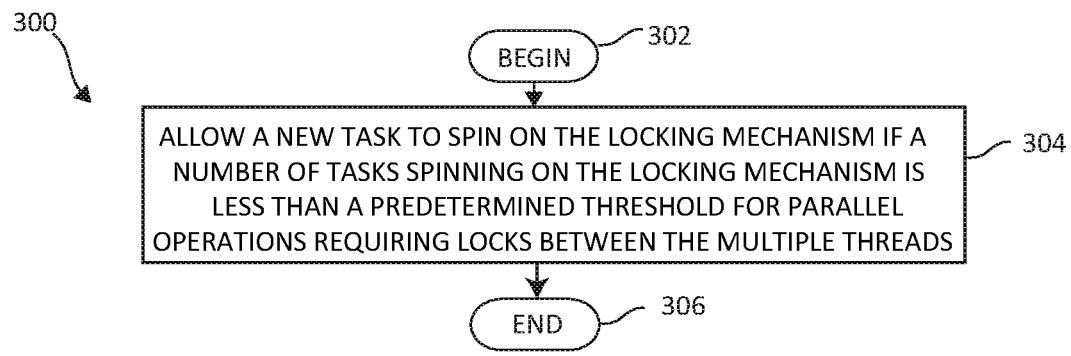
FIG. 3 is a flowchart illustrating an exemplary method for efficient task scheduling using a locking mechanism in which aspects of the present invention may be realized.

Turning to FIG. 3, a flowchart illustrates an exemplary method 300 for efficient task scheduling using a locking mechanism is depicted. The method 300 begins (step 302). The method 300 allows a new task to spin on the locking mechanism if a number of tasks spinning on the locking mechanism is less than a predetermined threshold for parallel operations requiring locks between the multiple threads (step 304). The method 300 ends (step 306).

Figure 4:
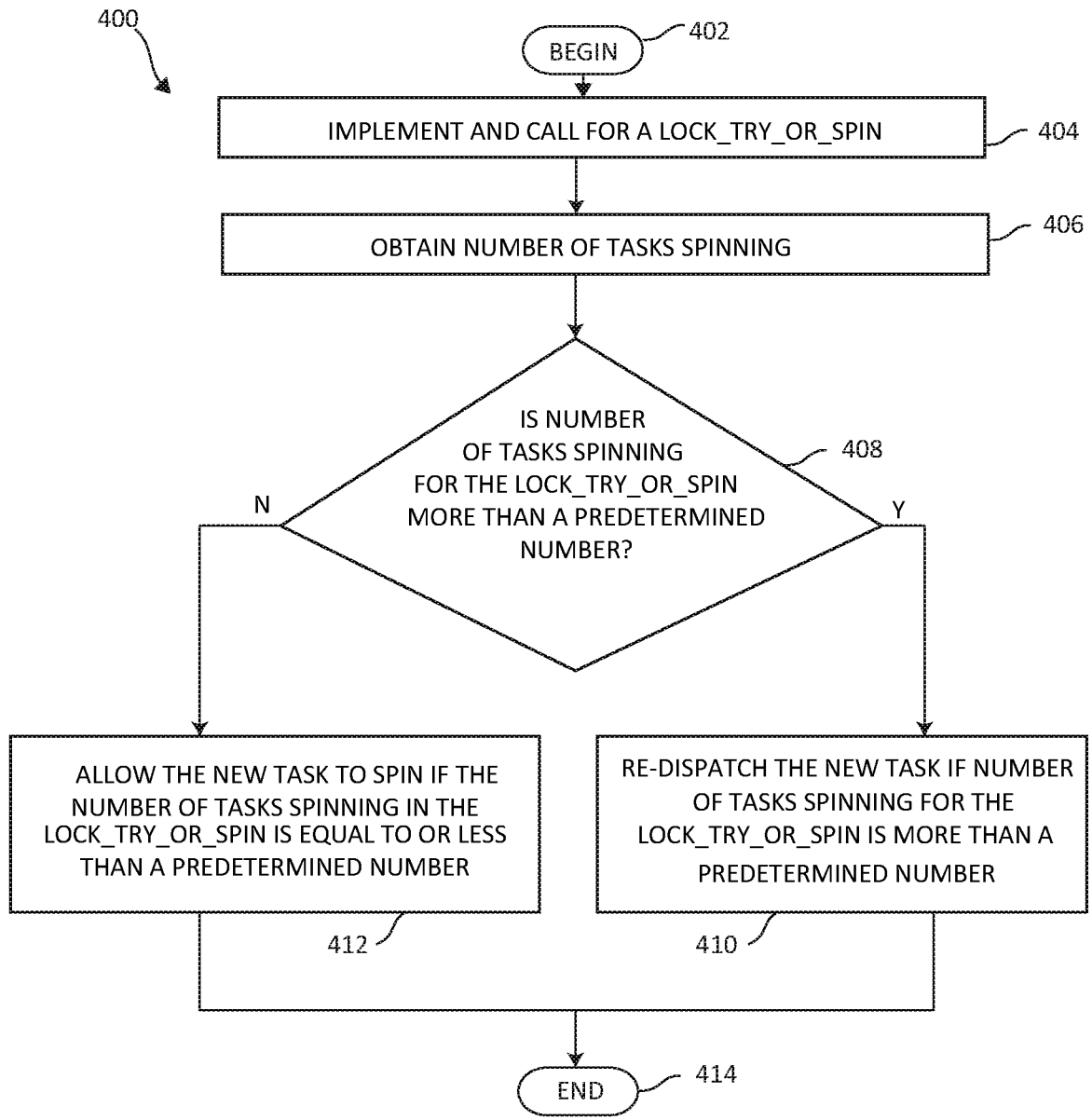
FIG. 4 is a flow chart illustrating an additional exemplary method for efficient task scheduling using a locking mechanism in which aspects of the present invention may be realized.

Turning to FIG. 4, a flowchart illustrates an additional exemplary method 400 for efficient task scheduling using a locking mechanism is depicted. The method 400 begins (step 402). The method 400 implements and calls for a Lock Lock_Try_or_Spin_(step 404). The method 400 obtains the number of tasks spinning on the Lock Lock_Try_or_Spin_ (step 406). The method 400 then determines if the number of tasks spinning on the locks (e.g., a Lock_Try_or_Spin) is more than a predetermined number (e.g., N, where N can be at least a value greater than 0 such as 1) (step 408). If yes, the method 400 re-dispatches a task if number of tasks spinning for the Lock_Try_or_Spin is more than a predetermined number (e.g., N, where N can be at least a value greater than 0 such as 1) (step 410). If the number of the tasks spinning for the Lock_Try_or_Spin is equal to or less than the predetermined number, the new task will spin on the lock (step 412). The method 400 ends (step 414).

In one embodiment, the present invention implements a new Lock_Try_or_Spin on the spin lock. The new Lock_Try_or_Spin works as follows: 1) If the number of tasks spinning for spin lock is more than N (N can be 1) then the algorithm returns a fail notification. If the number of tasks spinning for spin lock is equal to and/or less than N (N can be 1) then the task will spin on the lock. The number of tasks are already spinning can be obtained from other types of locks (e.g., ticket locks). For example, for ticket locks, the present invention can tell how many tasks/CPUs are waiting from the last ticket number given and current serving ticket number.

In one embodiment, the present invention calls for the Lock_Try_or_Spin. If Lock_Try_or_Spin fails, the present invention yields the processor and the task moves on to the dispatch queue. Thus, the present invention eliminates the need for tasks to wait to obtain a lock like generally occurs when using queue based locks. In one embodiment, the present invention eliminates the need to wait for a certain time and then abandons the task in the queue locks thereby eliminating the waste of CPU cycles.

Moreover, the present invention eliminates the need for every task to be spinning such as required by ticket locks, which means CPU cycles can be used by other tasks. Thus, the new Lock_Try_or_Spin may be implemented on top of ticket and/or queue-based locks.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for efficient task scheduling using a locking mechanism by a processor device in a computing environment, the method comprising:

allowing a new task to spin on the locking mechanism comprising a lock try-or-spin lock if a number of tasks spinning on the locking mechanism is less than a predetermined threshold for parallel operations requiring locks between multiple threads;

if the number of the tasks spinning on the locking mechanism is one of equal to and more than the predetermined threshold, performing the step of:

failing the new task in lieu of the new task entering a sleep state by returning a fail notification, yielding the processor device to execute additional tasks, and exiting the new task and thereby avoid having the new task spin in a a first queue having a first queue length of a separate ticket based lock, wherein the number of tasks spinning on the locking mechanism is determined by examining a last ticket number provided when compared to a current serving ticket number in the first queue of the ticket based lock and wherein the first queue is called to determine whether the number of tasks spinning on the locking mechanism is less than the predetermined threshold prior to dispatching the new task and allowing the new task to attempt to acquire the lock try-or-spin lock, and the ticket based lock.

2. A system for efficient task scheduling using a locking mechanism in a computing environment, the system comprising:

the locking mechanism; and at least one processor device operable in the computing environment in communication with the locking mechanism, wherein processor device:

allows a new task to spin on the locking mechanism comprising a lock try-or-spin lock if a number of tasks spinning on the locking mechanism is less than a predetermined threshold for parallel operations requiring locks between multiple threads, if the number of the tasks spinning on the locking mechanism is one of equal to and more than the predetermined threshold, performs the step of:

fails the new task in lieu of the new task entering a sleep state by returning a fail notification, yielding the processor device to execute additional tasks, and exiting the new task and thereby avoid having the new task spin in a first queue having a first queue length of a separate ticket based lock wherein the number of tasks spinning on the locking mechanism is determined by examining a last ticket number provided when compared to a current serving ticket number in the first queue of the ticket based lock and wherein the first queue is called to determine whether the number of tasks spinning on the locking mechanism is less than the predetermined threshold prior to dispatching the new task and allowing the new task to attempt to acquire the lock try-or-spin lock, and the ticket based lock.

3. A computer program product for efficient task scheduling using a locking mechanism in a computing environment by at least one processor device, the computer program product comprising a non-transitory computer-readable storage medium having computer-readable program code portions stored therein, the computer-readable program code portions comprising:

a first executable portion that allows a new task to spin on the locking mechanism comprising a lock try-or-spin lock if a number of tasks spinning on the locking mechanism is less than a predetermined threshold for parallel operations requiring locks between multiple threads;

a second executable portion that determines if the number of the tasks spinning on the locking mechanism is one of equal to and more than the predetermined threshold, performs the step of:

fails the new task in lieu of the new task entering a sleep state by returning a fail notification, yielding the processor device to execute additional tasks, and exiting the new task and thereby avoid having the new task spin in a first queue having a first queue length of a separate ticket based lock, wherein the number of tasks spinning on the locking mechanism is determined by examining a last ticket number provided when compared to a current serving ticket number in the first queue of the ticket based lock and wherein the first queue is called to determine whether the number of tasks spinning on the locking mechanism is less than the predetermined threshold prior to dispatching the new task and allowing the new task to attempt to acquire the lock try-or-spin lock, and the ticket based.

* * * * *